(12) United States Patent
Katou et al.

(10) Patent No.: US 6,674,211 B2
(45) Date of Patent: Jan. 6, 2004

(54) ROTARY ELECTRIC MACHINE HAVING CONDUCTORS INSULATED BY INSULATION SLEEVE INSERTED INTO CORE SLOT

(75) Inventors: Mitsuru Katou, Anjo (JP); Yasunori Kitakado, Okazaki (JP); Motohiro Murahashi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/323,973

(22) Filed: Dec. 20, 2002

(65) Prior Publication Data
US 2003/0127936 A1 Jul. 10, 2003

(30) Foreign Application Priority Data
Dec. 26, 2001 (JP) ........................................ 2001-394352

(51) Int. Cl.[7] .............................................. H02K 15/10
(52) U.S. Cl. .......................... 310/215; 29/596; 29/598; 29/734
(58) Field of Search ........................ 29/596, 598, 734; 310/215

(56) References Cited

U.S. PATENT DOCUMENTS

| | | | | |
|---|---|---|---|---|
| 1,661,355 A | * | 3/1928 | Baker ........................... | 29/598 |
| 3,130,335 A | * | 4/1964 | Rejda ........................... | 310/215 |
| 3,515,923 A | * | 6/1970 | Clizbe et al. ................ | 310/215 |
| 4,400,639 A | * | 8/1983 | Kobayashi et al. .......... | 310/215 |
| 4,994,700 A | * | 2/1991 | Bansal et al. ................ | 310/215 |
| 6,208,058 B1 | | 3/2001 | Taji et al. ..................... | 310/201 |
| 6,400,056 B1 | | 6/2002 | Naka et al. ................... | 310/215 |
| 2002/0014806 A1 | * | 2/2002 | Senoo et al. ................. | 310/215 |
| 2002/0053126 A1 | | 5/2002 | Maeda et al. ................. | 29/732 |

FOREIGN PATENT DOCUMENTS

| | | |
|---|---|---|
| JP | A 58-157349 | 9/1983 |
| JP | A 8-237897 | 9/1996 |

* cited by examiner

*Primary Examiner*—Burton Mullins
(74) *Attorney, Agent, or Firm*—Oliff & Berridge, PLC

(57) ABSTRACT

Plural slots are formed in a cylindrical stator or rotor core of a rotary electric machine. An insulation sleeve having a substantially rectangular cross-section is inserted into each slot, and conductors are inserted into an inner space of the insulation sleeve disposed in the slot. The inner space of the insulation sleeve is enlarged by inserting the conductors, thereby strongly pressing the corner portions of the insulation sleeve against the corners of the slot. Thus, the insulation sleeve is firmly kept in the slot, avoiding its sliding movement in the slot in the process of inserting the conductors. The insulation sleeve is prevented from being damaged by its sliding movement in the slot.

4 Claims, 3 Drawing Sheets

ROTARY ELECTRIC MACHINE HAVING CONDUCTORS INSULATED BY INSULATION SLEEVE INSERTED INTO CORE SLOT

CROSS-REFERENCE TO RELATED APPLICATION

This application is based upon and claims benefit of priority of Japanese Patent Application No. 2001-394352 filed on Dec. 26, 2001, the content of which is incorporated herein by reference.

BACKGROUND OF THE INVENTION

1. Field of the Invention

The present invention relates to a rotary electric machine such as an alternator or a starter motor for use in an automotive vehicle and to a method of manufacturing the same. More particularly, the present invention relates to a structure and a method for insulating conductors inserted into a slot of a core forming a rotor or a stator of a rotary electric machine.

2. Description of Related Art

A stator core of a rotary electric machine having conductor segments inserted into slots of the stator core in its axial direction has been known hitherto. Axial ends of the conductor segments are connected to one another forming a stator winding. For example, a method of manufacturing a stator having a stator winding formed by a plurality of U-shaped conductor segments is disclosed in JP-B2-3196738. The U-shaped conductor segment has a pair of conductors inserted into slots formed in a stator core. One conductor of the U-shaped conductor segment is inserted into one slot, while the other conductor is inserted into another slot which is apart from the one slot by a pole pitch. After plural conductor segments are all inserted into the slots, axial ends of conductors are connected to one another forming a stator winding.

JP-A-2001-37131 discloses a stator having a stator winding formed by plural L-shaped conductor segments. The L-shaped conductor segments are inserted into slots of the stator core from both axial ends thereof. Then, axial ends of the L-shaped conductor segments are electrically connected to one another to form a stator winding.

In such stators or rotors having the U-shaped or L-shaped conductor segments inserted in an axial direction of the stator core (referred to as a rotary electric machine having axially inserted conductors), a space factor for accommodating the conductors in a slot can be made higher, compared with a space factor in stators having a stator winding formed by winding a continuous wire. This is because conductor segments having a rectangular cross-section can be used in the stator using the U-shaped or L-shaped conductor segments. By improving the space factor in the slot, the rotary electric machine can be made compact in size and light in weight. Further, a rotary electric machine having a high output can be realized in a compact size.

In the rotary electric machine having axially inserted conductors, an insulation sleeve for electrically insulating the conductors from the core is inserted into each slot before the conductors are inserted. The insulation sleeve inserted into the slot tends to slide in its axial direction by a frictional force between the conductors and the insulation sleeve when the conductors are inserted into the insulation sleeve. Further, edges of the conductors may scratch the inner surface of the insulation sleeve, and thereby insulating ability of the insulation sleeve may be damaged.

In a rotary electric machine disclosed in JP-A-58-157349, an insulation sleeve made of a thermoplastic material having a widened end in a trumpet shape is used. The conductors are inserted into the insulation sleeve from the widened end. The widened end is formed by heating and deforming the end portion of the insulation sleeve. A neck portion of the widened end tends to become thin because the neck portion is strongly pressed against the edges of the slot due to a thrusting force given to the insulation sleeve by the conductors when the conductors are inserted into the insulation sleeve. If the neck portion becomes thin, the insulating ability of the sleeve is reduced.

To alleviate the contacting force between the neck portion of the widened end and the edges of the slot, the insulation sleeve may be pulled back in a direction opposite to a direction in which the conductors are inserted before inserting the conductors into the insulation sleeve, as disclosed in JP-A-2000-308314. However, there still remains a problem that the insulation ability at the neck portion is reduced, because it is difficult to maintain the pulled back position of the insulation sleeve against the thrusting force caused by insertion of the conductors.

SUMMARY OF THE INVENTION

The present invention has been made in view of the above-mentioned problems, and an object of the present invention is to provide an improved rotary electric machine, in which insulating ability of the insulation sleeve is not reduced by inserting conductors into the insulation sleeve. Another object of the present invention is to provide a method of manufacturing such an improved rotary electric machine.

The present invention is applicable to stator or rotor cores of various rotary electric machines. The present invention applied to a stator core of an alternator for use in an automotive vehicle will be described below as a representative example. The stator core is formed in a cylindrical shape, and a plurality of slots are formed along an inner bore of the stator core. An insulation sleeve, made of a thermoplastic resin material, having a substantially rectangular cross-section is inserted into each slot. Conductors forming a stator winding are inserted into the insulation sleeve. In other words, the conductors are electrically insulated from the stator core by the insulation sleeve.

The insulation sleeve includes four corner portions each contacting respective corners of the slot and flat portions positioned in parallel to sidewalls of the slot. When the insulation sleeve is inserted into the slot, the flat portions of the insulation sleeve are positioned apart from the sidewalls of the slot, forming certain spaces between the flat portions and the sidewalls. An inner space of the insulation sleeve is enlarged by inserting the conductors into the insulation sleeve, and thereby flat portions are brought into contact with the sidewalls of the slot, and the corner portions are further pressed against the corners of the slot.

Thus, the insulation sleeve is firmly kept in the slot, avoiding its movement in the longitudinal direction by insertion of the conductors. The insulation sleeve is protected from being damaged by its longitudinal slide in the slot. Accordingly, the conductors are properly insulated from the stator core by the insulation sleeve kept in the slot.

The insulation sleeve is made of a thermoplastic resin tape. Bending lines to be positioned at boundaries between the corner portions and flat portions are formed on the resin tape along its longitudinal direction. Then, the resin tape is folded into the shape of the insulation sleeve. Then, the folded resin tape is cut into an individual insulation sleeve having a predetermined length. The insulation sleeve thus formed is inserted into each slot of the stator core. Preferably, one end of the insulation sleeve from which the conductors are inserted is widened in a trumpet shape to facilitate easy insertion of the conductors.

According to the present invention, the insulation sleeve is prevented from sliding in the slot in the process of inserting the conductors into the insulation sleeve, and damages of the insulation sleeve due to its sliding in the slot are avoided.

Other objects and features of the present invention will become more readily apparent from a better understanding of the preferred embodiment described below with reference to the following drawings.

DETAILED DESCRIPTION OF THE PREFERRED EMBODIMENT

Figure 1:
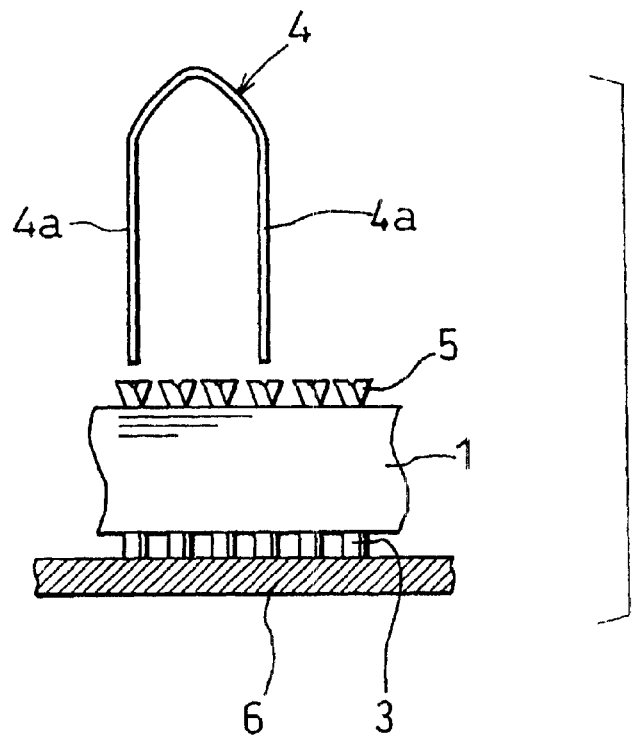
FIG. 1 is a partial side view showing a stator into which a U-shaped conductor segment is to be inserted in an axial direction of the stator.

A preferred embodiment of the present invention will be described with reference to accompanying drawings. In this embodiment, the present invention is applied to a stator core of an alternator for use in an automotive vehicle. The present invention, however, may be applied to a stator core or a rotor core of other rotary electric machines. A plurality of slots 2 are formed in a stator core 1 along its circumferential direction. An insulation sleeve 3 is inserted into each slot 2 in an axial direction of the stator core 1. A U-shaped conductor segment 4 having a pair of conductors 4a is inserted into a space S inside the insulation sleeve 3. After the U-shaped conductor segments 4 are all inserted, free ends of the conductors 4a are connected to one another in a known way, thereby forming a stator winding.

Figure 2:
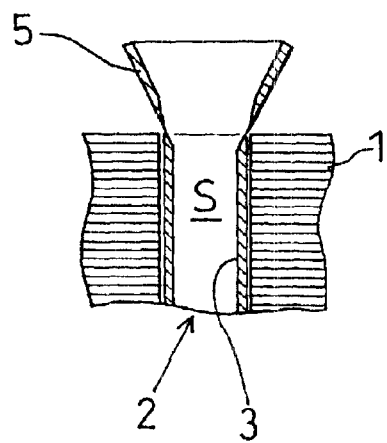
FIG. 2 is a cross-sectional view showing a slot of the stator into which an insulation sleeve is inserted, taken along a circumferential direction of the stator.

As shown in FIGS. 1 and 2, one end 5 of the insulation sleeve 3 is widened in a trumpet shape, so that the conductor 4a is easily inserted into the insulation sleeve 3. The other end of the insulation sleeve 3 abuts a stopper plate 6 so that the insulation sleeve 3 does not slide down in its axial direction by insertion of the conductor 4a into the insulation sleeve 3. The stopper plate 6, however, may be eliminated as described later.

Figure 3:
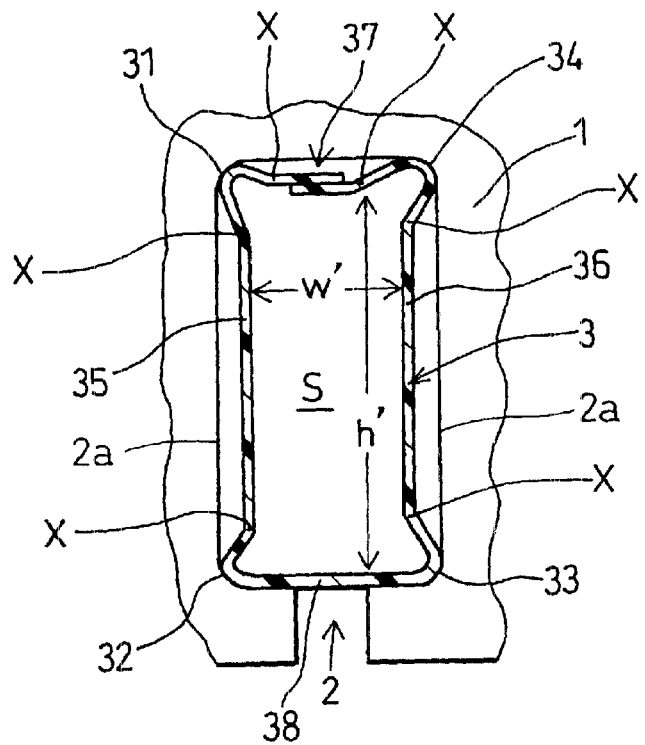
FIG. 3 is a cross-sectional view showing a slot of the stator into which an insulation sleeve is inserted, taken along a radial direction of the stator.

Referring to FIG. 3 which shows a cross-sectional view of the slot 2 in the radial direction of the stator core 1, a shape of the insulation sleeve 3 accommodated in the slot 2 will be described. The insulation sleeve 3, in its cross-section, includes four corner portions 31, 32, 33, 34 and four flat portions 35, 36, 37, 38. The corner portions 31-34 contact respective corners of the slot 2, and the flat portions 35, 36 are positioned in parallel to sidewalls 2a of the slot 2 forming certain spaces therebetween. The flat portion 37 including an overlapped portion is positioned in parallel to upper wall of the slot 2 forming a certain space therebetween. The flat portion 38 is positioned in contact with a lower wall of the slot 2.

The insulation sleeve 3 is formed by folding a resin tape made of a thermoplastic resin material. Bending lines X, each extending along a boundary between the corner portion and the flat portion, are formed by plastically deforming the resin tape in its longitudinal direction. The bending lines X may be formed by pressing a roller having a triangular projection against the resin tape. Preferably, the roller is heated in a process of forming the bending lines X, and a tip angle of the triangular projection is made less than 90°. After the bending lines X are formed on the resin tape, the resin tape is folded to form rounded corner portions 31–34 and the flat portions 35–38. Then, the folded resin tape having a substantially rectangular cross-section is cut into an individual insulation sleeve 3 having a required length.

The insulation sleeve 3 thus made is inserted into each slot 2. Then, the widened end 5 is formed in a trumpet shape by pushing a heated head against one end of the insulation sleeve 3. The stopper plate 6 is disposed to support the other end of the insulation sleeve. Then, the conductors 4a are inserted into each insulation sleeve 3.

Figure 4:
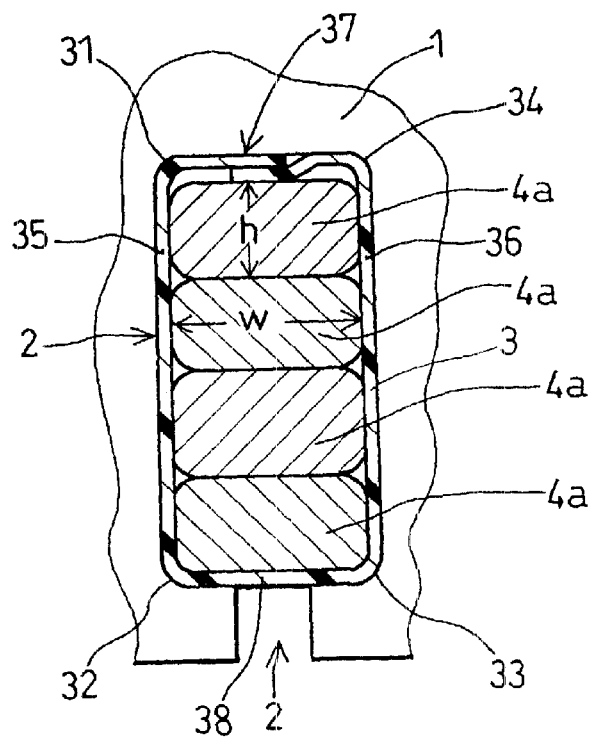
FIG. 4 is a cross-sectional view showing a slot of the stator which accommodates an insulation sleeve and conductors therein, taken along a radial direction of the stator.

FIG. 4 shows a cross-section of the slot 2 in which the conductors 4a are inserted into the insulation sleeve 3. Each conductor 4a has a substantially rectangular cross-section having a width w and a height h. The width w is made larger than an inside width w' (shown in FIG. 3) of the insulation sleeve 3, so that the flat portions 35, 36 are pushed against the sidewalls 35 of the slot 2 by insertion of the conductors 4a. The height h of each conductor 4a is so made that a total height of all the conductors 4a accommodated in a slot 2 becomes larger than an inside height h' (shown in FIG. 3) of the insulation sleeve 3. However, it is not essential to make the total height of the conductors 4a larger than the inside height h' of the insulation sleeve 3.

As shown in FIG. 4, the inside space S of the insulation sleeve 3 are enlarged by inserting the conductors 4a, and thereby the flat portions 35–38 are brought into close contact with the inside walls of the slot 2. The flat portions 35–38 are compressed in this process because four corner portions 31–34 of insulation sleeve 3 are already in contact with the respective corners of the slot 2 before insertion of the conductors 4a. The corner portions 31–34 are further pushed against the corners of the slot 2 by the compressive force imposed on the flat portions 35–38. As a result, the insulation sleeve 3 is firmly held in the slot 2 and is prevented from sliding in its axial direction by a thrusting force imposed thereon in the process of inserting the conductors 4a. In particular, the neck portion of the widened portion 5 is not pushed against the edges of the slot 2 in the process of inserting the conductors 4a. The original position of the insulation sleeve 3 in the slot 2 is maintained during the insertion process of the conductors 4a, and thereby insulating ability of the insulation sleeve 3 is not adversely affected or damaged by insertion of the conductors 4a.

Figure 5:
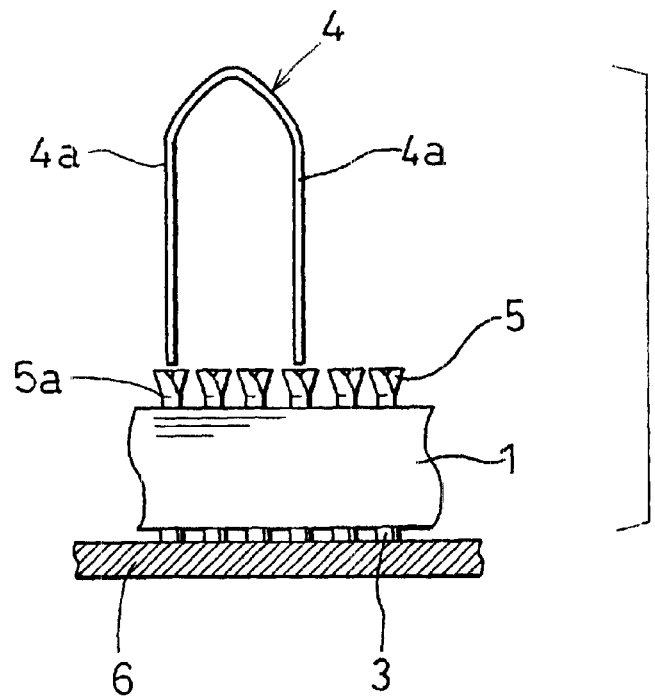
FIG. 5 is a partial side view of a stator into which an U-shaped conductor segment is to be inserted in an axial direction of the stator, insulation sleeves inserted into slots of the stator being positioned at a pulled-back position.
Figure 6:
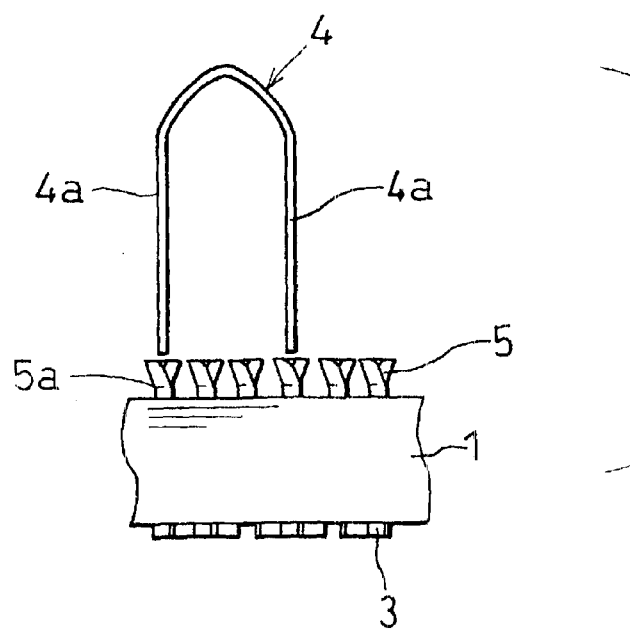
FIG. 6 is a similar side view of the stator as in FIG. 5, a stopper plate used in FIG. 5 being eliminated.

FIG. 5 shows a slightly modified form of the process of inserting conductors 4a into the insulation sleeves 3. The insulation sleeves 3 are positioned in the slots 2 so that neck portions 5a of the widened portion 5 are located not to contact the upper edges of the slots 2. The other ends (bottom end) of insulation sleeves 3 are supported by the stopper plate 6. The corner portions 31–34 of the insulation sleeve 3 are strongly pushed against the corners of the slot 2 in this case, too. Accordingly, the original position of the insulation sleeve is not changed by insertion of the conductors 4a. As shown in FIG. 6, the stopper plate 6 may be eliminated because the insulation sleeve 3 is prevented from sliding in its axial direction without using the stopper plate 6. By eliminating the stopper plate 6, the jigs used in the process of inserting the conductors 4a can be simplified.

In the insulation sleeve 3 shown in FIG. 3, the flat surface 38 is originally positioned in contact with the wall of the slot 2 without forming the bending lines X along the boundaries between the flat portion 38 and the corner portions 32, 33. It is possible, however, to form the bending lines X in the same manner as in other boundaries. The width w' of the insulation sleeve 3 is widened by inserting each conductor 4a, while its height h' is widened after all the conductors 4a are inserted in to the insulation sleeve 3.

The present invention is not limited to the embodiment described above, but it may be variously modified. For example, though the cross-section of the insulation sleeve 3 is formed in a substantially rectangular shape in the foregoing embodiment, the cross-section may be formed in other shapes as long as the inner space is widened by inserting the conductors 4a and the corner portions 31–34 are pushed against the corners of the slot 2. The bending lines X may not be made as continuous lines, but they may be made intermittently. It is preferable to thermally connect the overlapping portion on the flat portion 37, but it may be simply overlapped without being connected. The overlapping portion on the flat portion 37 may be eliminated, and both ends of the resin tape may be abutted and connected to each other. Though it is preferable to widen the end portion 5 of the insulation sleeve 3 in a trumpet shape, but the widening process may be eliminated. The present invention is applied to the stator core of the alternator in the foregoing embodiment, it may be applied to stator or rotor cores of various rotary electric machines.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A rotary electric machine comprising:
    a core forming a stator or a rotor of the rotary electric machine, a plurality of slots each having a substantially rectangular cross-section being formed in the core;
    an insulation sleeve having a substantially rectangular-cross-section inserted into each slot; and
    conductors inserted into the insulation sleeve, wherein:
        the insulation sleeve includes corner portions contacting respective corners of the slot and flat portions positioned in parallel to sidewalls of the slot;
        the flat portions of the insulation sleeve are positioned apart from the sidewalls of the slot, forming certain spaces therebetween when the conductors are not inserted into the insulation sleeve; and
        a cross-sectional size of the conductors is so made that the flat portions of the insulation sleeve are pushed against the sidewalls of the slot when the conductors are inserted into the insulation sleeve.

2. The rotary electric machine as in claim 1, wherein:
    the insulation sleeve has bending lines each extending along a boundary between the corner portion and the flat portion.

3. The rotary electric machine as in claim 1, wherein:
    one of the longitudinal ends of the insulation sleeve from which the conductors are inserted is widened in a trumpet shape.

4. A method of manufacturing the rotary electric machine defined in claim 1, the method comprising:
    forming the bending lines by plastically deforming a resin tape from which the insulation sleeve is made, the bending lines extending in a longitudinal direction of the resin tape;
    folding the resin tape in a shape of the insulation sleeve;
    cutting the folded resin tape into an individual insulating sleeve having a predetermined longitudinal length;
    inserting the insulation sleeve into each slot; and
    inserting the conductors into the insulation sleeve, thereby enlarging an inner space of the insulation sleeve and pushing the corner portions of the insulation sleeve against respective corners of the slot.

* * * * *